United States Patent

[11] 3,627,964

[72] Inventor Jack Morris
 Monsey, N.Y.
[21] Appl. No. 297,912
[22] Filed July 26, 1963
[45] Patented Dec. 14, 1971
[73] Assignee AMF Incorporated

[54] LAPPED WELDING OF METAL EDGE PORTIONS
 16 Claims, 9 Drawing Figs.
[52] U.S. Cl. ................................................ 219/64
[51] Int. Cl. ................................................ B23k 1/16
[50] Field of Search .......................................... 219/59, 64,
 8.5, 67, 160

[56] References Cited
 UNITED STATES PATENTS
2,922,020 1/1960 Andrew ....................... 219/59 X 3,148,262 9/1964 Hughes ........................ 219/59 X Primary Examiner—J. V. Truhe
Assistant Examiner—Robert O'Neil
Attorneys—George W. Price and John H. Gallagher ABSTRACT: In the welding together of edge portions of metal strip with high-frequency electric current, the portions are advanced toward a weld point first in nonoverlapping relation, then in overlapping relation and finally in overlapping, contacting relation at the weld point where they are pressed together. The current is applied so as to flow on the edge portions both before and after the point where they are first brought into overlapping relation so as to restrict the heating of the edge portions to the edges and narrow facing bands adjacent thereto.

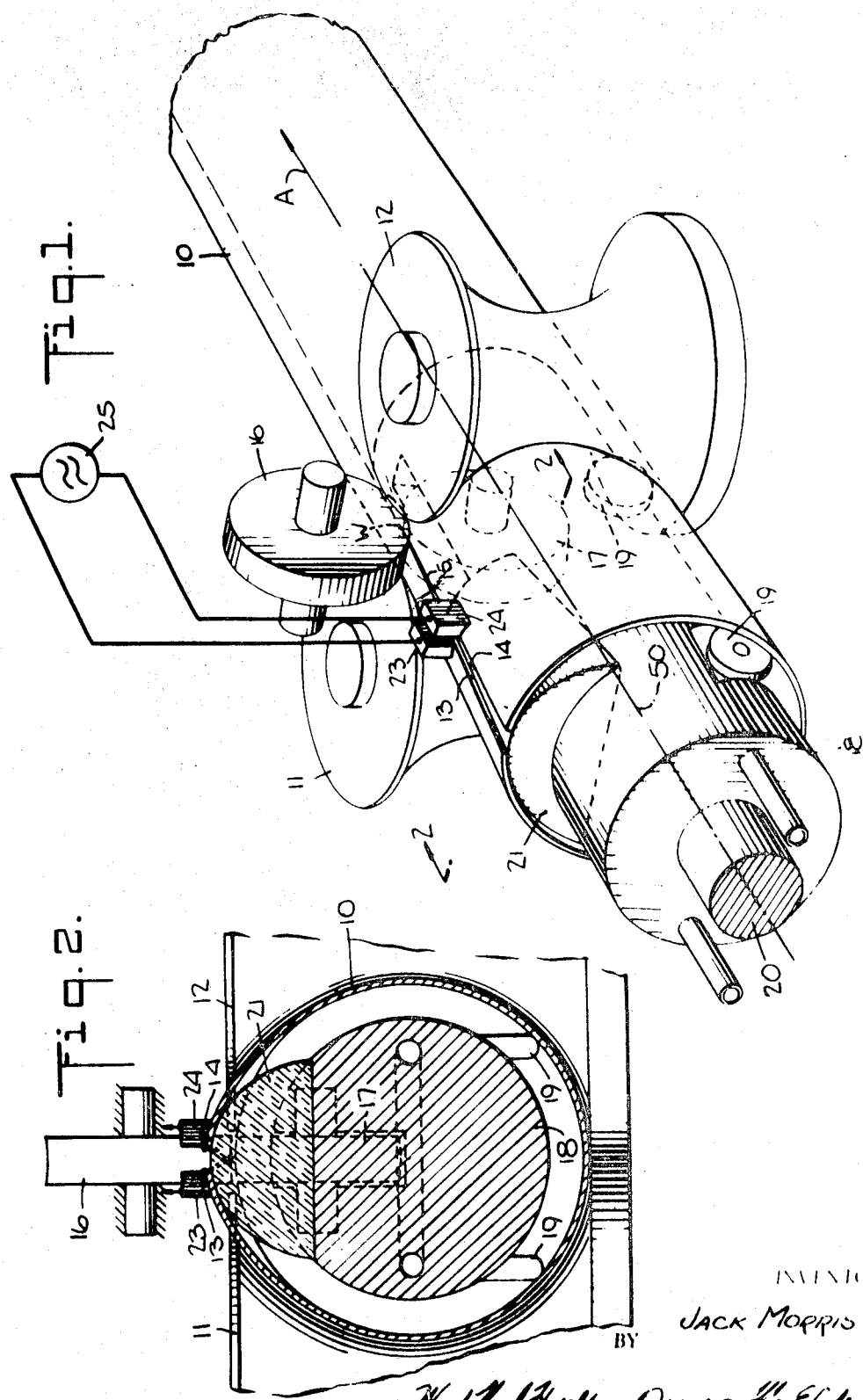

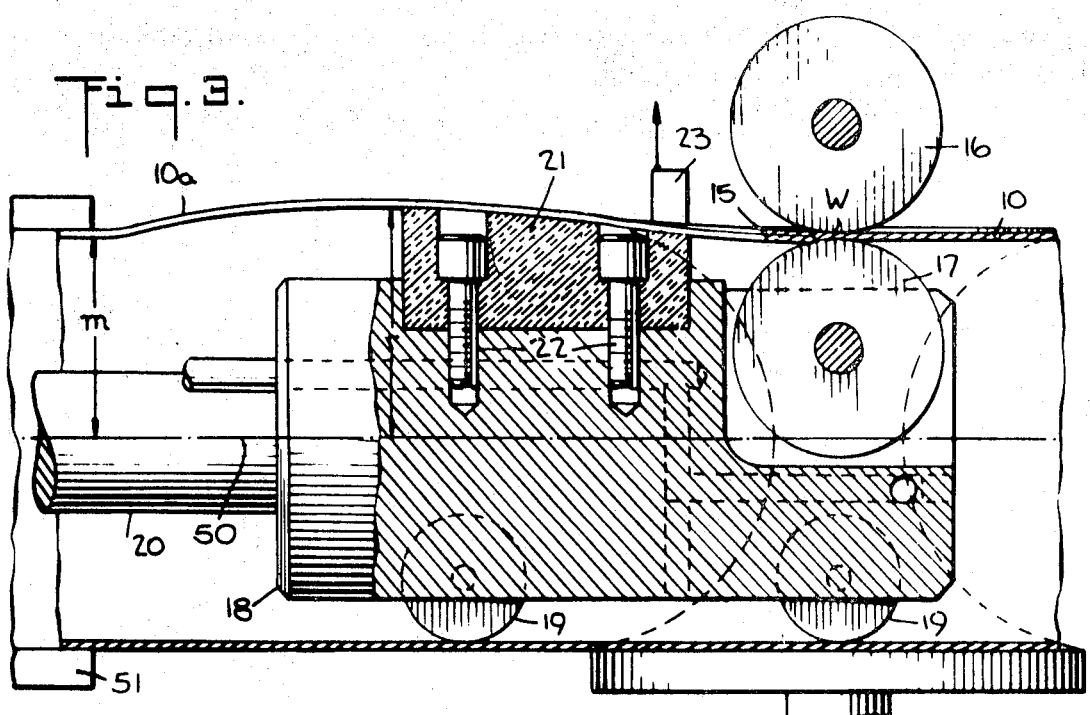
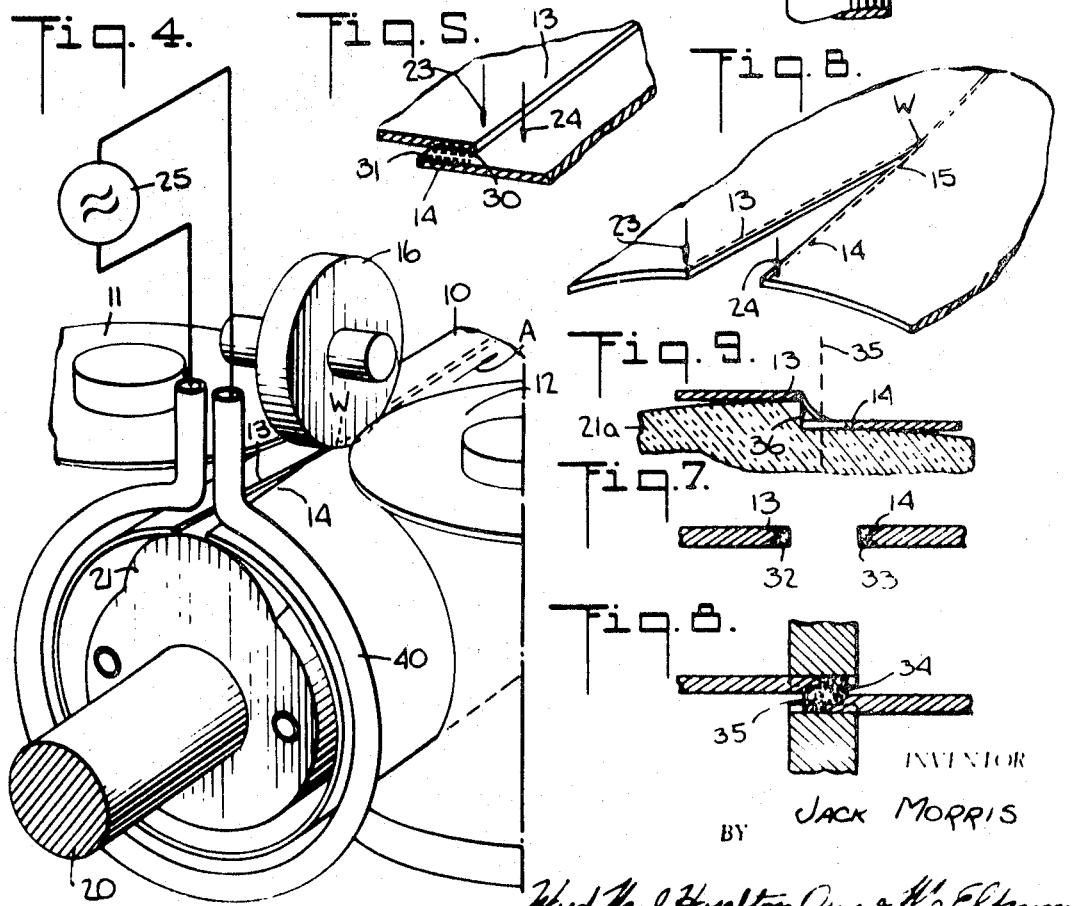

LAPPED WELDING OF METAL EDGE PORTIONS

This invention relates to methods and apparatus for continuously welding together longitudinally opposed edge portions of metal parts such as the edge portions of strip formed into tubing or the edge portions of separate metal strips. More particularly, the invention is directed to the welding of such edge portions together in overlapping relationship with high-frequency electrical heating currents applied to the edge portions in advance of the weld point.

In U.S. Pat. No. 2,886,691, methods and apparatus are disclosed for using high-frequency current to weld together opposed edges of metal strip in overlapping relationship. In the methods and apparatus therein disclosed, the edge portions are in overlapping, but separated relationship in advance of the weld point. Accordingly, as pointed out in said patent, the heating current is restricted substantially to bands on the opposed approaching surfaces and the bands which become heated to welding temperature will be substantially the same width as the width of the overlap by reason of the mutual inductance effects between the currents on the upper and lower opposed surfaces.

However, it is difficult during the welding of such edge portions, particularly at high speeds, to maintain the amount of overlap within predetermined limits and, therefore, the width of the overlapping welded seam may vary, causing obvious difficulties with the regularity of the diameter of tubing formed, and sometimes causing undesirable heat patterns to extend beyond the edge portions which are actually welded together to form the weld seam.

The problem cannot, for practical reasons, be solved by merely reducing the length of metal between the position at which current is supplied and the weld point. For example, the forming and forging rollers restrict the minimum distance between such position and the weld point and the heat inertia of the metal is such that at high speeds the metal must be subjected to the heating currents for a predetermined length of time if the use of excessively large amounts of heating currents and hence power are to be avoided.

When the metal is relatively thin, i.e. 0.010 inches or less, as is used in making tubular can stock, it is highly desirable to maintain the edge portions under tension and at the correct angle in advance of the weld point to maintain the edges in the correct "V" relation and to prevent buckling of the edge portions with heating expansion. Also, if contacts are employed to supply the heating currents to the metal, support for the metal is desirable under the portions thereof contacted by such contacts to provide proper contact pressure and to prevent collapse or sagging of the metal.

In accordance with the method of the present invention, the edge portions of metal strip or strips are welded together in overlapping relation, and high-frequency electrical currents having a frequency high enough to produce the desired current distribution are maintained along the edge portions prior to the weld point. However, in order to avoid variations in the width of the heated bands of metal, to simplify the problems of alignment of the edge portions in overlapping arrangement, and to permit the production of very narrow weld seams, the edge portions are maintained in nonoverlapping relationship, preferably in edge-to-edge or side-by-side relationship, from the point at which the high-frequency electrical heating currents are supplied to a position immediately in front of the weld point, at which position, the edge portions are brought into overlapping relationship. Accordingly, the heating of the edge portions is confined substantially to the edges themselves until shortly in advance of the weld point where the edge portions are brought into overlapping relationship and the heated area is then expanded to include the opposed overlapping surfaces. In this way, any variations in the width of the heated band due to sidewise movement of the edge portions between the point at which the welding currents are supplied and the weld point are substantially eliminated.

The preferred embodiment of the apparatus of the invention comprises a shoe for maintaining the edge portions in the desired relationship in advance of the weld point and for providing a support and tensioning means for the edge portions in the event that the high-frequency electrical currents are supplied thereto by means of electrodes in contact with the edge portions.

Other objects and advantages of the invention will be apparent from the following detailed description of preferred embodiments thereof, which description should be considered in conjunction with the accompanying drawings, which illustrate the preferred forms of the invention and in which:

FIG. 1 is a somewhat schematic, perspective view of apparatus for carrying out the invention for the welding of tubing, for example, tubing for making cans, and employing contact electrodes;

FIG. 2 is a vertical sectional view of the apparatus of FIG. 1 and is taken along the line 2—2 indicated in FIG. 1;

FIG. 3 is an enlarged, cross-sectional, side elevation view of the apparatus shown in FIG. 1;

FIG. 4 is a somewhat schematic, perspective view of a modified form of the apparatus shown in FIG. 1 and using an induction coil for supplying the heating currents to the edge portions; and FIGS. 5–9 are fragmentary schematic drawings employed to explain the principle of the invention.

FIG. 1 illustrates a length of thin sheet metal tubing 10 being advanced in the direction of the arrow A through the welding apparatus, the tubing 10 being supported and formed by a pair of rollers 11 and 12, forming part of a known type of tube mill. Other parts of the known type of tube mill are not shown in FIG. 1, but generally, such mill comprises apparatus, such as the roller 51 (FIG. 3) forming part thereof, in advance of the rollers 11 and 12 for forming metal strip into substantially tubular shape and various other components for advancing and supporting the tubing 10 and the metal strip from which it is formed.

In the arrangement shown in FIG. 1, the edge portions 13 and 14 of the strip are maintained in spaced-apart relation at substantially the same level up to a point or position such as the point or position 15, shortly in advance of the weld point W, at which weld point W, the temperature of the edge portions 13 and 14 is such that the edge portions 13 and 14 may be forge welded together. The so-heated portions are forced together by means of an upper suitably supported roller 16 and a lower roller 17 mounted on a carriage 18 which may be of the same construction as the carriage 30 shown and described in said U.S. Pat. No. 2,886,691. The carriage 18 is mounted in a fixed position within the tubing and is supported by rollers 19 engaging the inside lower surface of the tubing 10. Such carriage 18 may be retained in position by a mandrel 20 attached thereto and extending back to any suitable supporting means located prior to the point where the edge portions 13 and 14 are brought close together.

The edge portions 13 and 14 are supported in advance of the point 15 where the edge portions 13 and 14 are brought into overlapping relationship by means of a shoe 21 which may be formed of any suitable insulation material having the required high-temperature and wearing properties and may, for example, be made of ceramic, such as steatite or an alumina ceramic manufactured by Diamonite Products Mfg. Co., Shreve, Ohio, or fired lava. The shoe has an arcuate upper surface which engages the lower surfaces of the edge portions 13 and 14 and which is supported by the carriage 18 being secured thereto in any suitable manner, such as by the screws 22 (FIG. 3).

In the preferred form of the apparatus of the invention, the high-frequency currents are supplied to the strip in advance of the point 15 by means of a pair of fluid cooled electrodes 23 and 24 mounted in a known manner on any suitable means (not shown) in position for sliding engagement with the metal strip. The electrodes 23 and 24 are connected in a conventional manner to a source of high-frequency current 25 and they may be of a construction similar to that disclosed in U.S. Pat. Nos. 2,886,691 and 2,818,488. In order to obtain the desired current distribution, the source 25 should have a current frequency of the order of about 100,000 cycles per second, or, preferably, higher such as from 300,000 to 500,000 cycles per second, and the current of such frequencies will be concentrated at the edge portions 13 and 14 as described in said patents.

For example, as illustrated in Fig. 5, the current is concentrated at the opposing surfaces 30 and 31 when the edge portions 13 and 14 are in overlapping relationship so that the heating of the edge portions 13 and 14 is confined substantially to narrow adjacent bands, indicated by the shading and approximately equal in width to the amount of overlapping of the edge portions 13 and 14. However, if the edge portions 13 and 14 overlap each other for a substantial period of time prior to being welded together, the heating may spread by conduction to portions of the metal strip outside of the overlapping bands and to the upper and lower surfaces respectively, of the edge portions 13 and 14. In addition, if during such period of time, the edge portions 13 and 14 move or "wander" with respect to each other, the width of the heated band may be wider at various spots than that necessary for satisfactory welding and hence may produce undesirable heat bands or discoloration of the metal adjacent to the weld seam.

In accordance with the invention, the edge portions 13 and 14 are maintained spaced apart and in nonoverlapping relationship between the points at which the high-frequency currents are supplied up to a point 15 shortly in advance of the weld point W as illustrated in FIGS. 1 and 6. Thus, as shown in FIG. 6, the edge portions 13 and 14 are maintained in side-by-side or edge-to-edge relationship from the points at which the electrodes 23 and 24 contact the strip, to the point 15, at which the portions 13 and 14 are brought into overlapping relation. In this way, the heating of the edge portions 13 and 14 in advance of the point 15 is confined substantially to relatively narrow portions of the edges as illustrated by the shaded areas 32 and 33 in FIG. 7. In other words, due to the frequency of the currents employed and the mutual inductance effects between the edge portions 13 and 14 when they are in edge-to-edge relationship, the currents, and hence the heating, are confined to relatively shallow bands, substantially less in circumferential dimension than the circumferential dimensions of the bands on the surfaces 30 and 31 illustrated in FIG. 5. Furthermore, movement of the edge portions 13 and 14 toward and away from each other will cause only slight changes in the circumferential dimensions of the bands 32 and 33.

However, when the edge portions 13 and 14 are brought into overlapping relationship, the heating bands spread circumferentially along the opposing surfaces as illustrated in FIG. 8, such FIG. 8 illustrating by the shading 34 and 35 the heated bands shortly after the edge portions 13 and 14 have been brought into overlapping relationship at the point 15. Since the point 15 is only shortly in advance of the weld point W, there is little opportunity for the edge portions 13 and 14 to "wander" during the movement from point 15 to the weld point W and, in addition, there is very little time for the heating bands to spread by means of conduction. Accordingly, the heating of the metal edge portions 13 and 14 is confined substantially to the width of the opposing surfaces which are brought into overlapping relationship at the point 15 thereby eliminating undesired heat discoloration and simplifying the control of the relative position of the edge portions 13 and 14. In addition, it is unnecessary to maintain a relatively large width of overlap of the edge portions 13 and 14 in order to insure adequate heating of the edge portions 13 and 14 prior to welding and, therefore, the method of the invention makes it simpler and easier to produce weld seams which are relatively narrower than those which may be produced in accordance with the methods and apparatus of U.S. Pat. No. 2,886,691.

Although it is preferred that the edge portions 13 and 14 be maintained in edge-to-edge relationship prior to the point 15, as illustrated in FIGS. 1, 6 and 7, the results of the invention may be accomplished to a somewhat lesser degree by merely maintaining the edge portions 13 and 14 on opposite sides of a plane extending along the weld seam such as the plane 35 illustrated in FIG. 9. In FIG. 9, the edge portions 13 and 14 are disposed on opposite sides of the plane 35, but the edge portion 13 is raised above the edge portion 14 in a advance of the point 15. The edge portion 13 may be maintained in the elevated position by means of a modified shoe 21a having a step 36 in the upper surface thereof.

As illustrated in FIG. 4 of the drawings, the heating currents may be supplied to the metal strip forming the tubing 10 by means of an induction coil 40 extending around the strip and connected to the high-frequency source 25. By means of the induction coil 40, high-frequency heating currents are induced in the metal strip and such currents flow along the edge portions 13 and 14 are confined thereto in the same manner as the currents are confined with the embodiments previously described. The remaining apparatus illustrated in FIG. 4 is the same as the apparatus shown in FIGS. 1-3, and the parts thereof are identified by the same reference numerals.

It will be observed from an examination of FIG. 3 that as the metal sheet 10a approaches the shoe 21 from the preceding forming apparatus of the mill, the edge portions thereof are forced arcuately upwardly by the shoe 21 and are thereby placed under tension, not only in advance of the shoe 21, but between the shoe 21 and the weld point W. Also, it will be observed that the shoe 21 underlies the contacts 23 and 24, engaging the under surfaces of the metal sheets or sheet, and thereby providing support for the surfaces under the contacts 23 and 24. The shoe 21 thereby permits the application of the contacts 23 and 24 to the upper surfaces of the sheets or sheet with substantial pressure, improving the contact between the contacts 23 and 24 and the surfaces and preventing collapse or sagging of the metal at this point.

It will be noted that the circumference of the tube 10 is less than the width of the strip 10a due to overlapping of the edge portions 13 and 14 and, if the edges of the strip 10a were abutting, then the radius of the tube would be the width of the strip 10 divided by $2\pi$. It will also be noted from FIG. 3 that the radius $r$, with respect to the axis 50 of the tube 10 and at the forward or leading end of the shoe 21, is greater than the inner radius of the tube 10 and greater than the inner radius $m$ of the partially closed tube formed by the strip 10a advance of the forward end of the shoe 21. In general, the radius $r$ should be approximately 10 percent greater than the radius $m$ to obtain the desired tensioning effect with thin materials and, in one embodiment of the invention, the radius $m$ was approximately 10 percent greater than the radius of the tube 10. Accordingly, in order to obtain the desired tensioning of the edge portions 13 and 14 and to maintain the desired edge-to-edge relation thereof in advance of the position 15, it is preferred to maintain the forward or leading upper surface of the shoe 21 at a radius $r$ with respect to the axis 50 of the tube 10, which is at least 20 percent greater than the width of the strip 10a, divided by $2\pi$.

The shoe 21 tapers in both lengthwise and crosswise cross section in the direction of movement of the tube 10 and preferably the shoe 21 terminates shortly in advance of the position 15 where overlapping of the tube portions 13 and 14 commences. The amount of taper of the shoe 21 is dependent on the angle of the "V" which it is desired to maintain between the edge portions 13 and 14 in advance of the position 15, such angle being selected in a manner well known in the art.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended hereto.

What is claimed as new and desired to be secured by Letters Patent is:

I claim:

1. A method of electrically welding together the edge portions of metal strip in overlapping relation which comprises moving the edge portions along predetermined paths in spaced, nonoverlapping relation in advance of the desired weld point, moving the edge portions of the strip into overlapping relation at a point in advance of said weld point, forcing said edge portions together at the weld point and maintaining electrical currents of a frequency of the order of 100,000 cycles per second or higher at the edges of the strip from in advance of said point where the edge portions are brought into overlapping relation and up to the weld point.

2. A method of electrically welding together the edge portions of metal strip in overlapping relation which comprises moving the edge portions along predetermined paths in spaced, nonoverlapping relation in advance of the desired weld point, moving the edge portions of the strip into overlapping relation at a point in advance of said weld point, forcing said edge portions together at the weld point and maintaining electrical currents of a frequency of the order of 100,000 cycles per second or higher at the edges of the strip both in advance of and after said point where the edges are brought into overlapping relation.

3. A method of electrically welding together the edge portions of metal strip in overlapping relation which comprises moving the edge portions along predetermined paths in spaced, edge-to-edge relation in advance of the desired weld point, thereafter moving the edge portions of the strip into spaced overlapping relation at a point immediately ahead of said weld point and maintaining electrical currents of a frequency of the order of 100,000 cycles per second or higher at the edges of the strip both in advance of and after said point where the edges are brought into overlapping relation.

4. Method for welding together two elongated sheet metal portions with a lapped seam, comprising: longitudinally advancing the portions with the portions in nonoverlapping relation and then at a later position bringing one of same into partially overlying lapped relation to, and with a diminishing spaced relation to the other, whereby a narrow band on the undersurface of the overlying portion comes into contact with a narrow band on the upper surface of the underlying portion at a desired weld point; heating said portions both in advance of said position and the weld point by maintaining on same flows of electrical current of a frequency of the order of 100,000 cycles per second or higher by supplying current to said portions in advance of said position, whereby the current flows to and from the weld point along on said bands and the portions in advance of said position, the current becoming more and more concentrated on the surfaces of said bands as they approach contact with each other due to the mutual inductance of the current on said bands at said high frequency; maintaining supporting means engaging the undersurface of the underlying portion at a region substantially directly beneath the weld point; applying pressure to the upper surface of the overlying portion substantially directly over the weld point to press said portion firmly against and into welded relation to the underlying portion, the current as applied being sufficient to heat the surface of the metal along on said bands to welding temperature as same reach the weld point.

5. Method for welding together with a lapped seam, the portions adjacent a longitudinal gap in sheet metal tubing, which method comprises: longitudinally advancing the tubing with the portions in nonoverlapping relation and then at a later position bringing one of said portions into overlying lapped relation to and with a diminishing spaced relation to the other, whereby a narrow band on the undersurface of the overlying portion comes into contact with a narrow band on the upper surface of the underlying portion at a desired weld point; heating said portions both in advance of said position and the weld point by maintaining on same flows of electrical current of a frequency of the order of 100,000 cycles per second or higher by supplying said current to said portions in advance of said position, whereby the current flows to and from the weld point along on said bands and the edge portions in advance of said position, the current becoming more and more concentrated on the surfaces of said bands as they approach contact with each other due to the mutual inductance of the current flowing thereon at said high frequency; maintaining supporting means within the tubing and engaging the undersurface of the underlying portion to retain same at a predetermined elevation while passing beneath the weld point; applying pressure to the upper surface of the overlying portion substantially directly over the weld point to press said portion firmly against and into welded relation to the underlying portion, the current as applied being sufficient to heat the surface of the metal along on said bands to welding temperature as same reach the weld point.

6. Method for welding together with a lapped seam, the portions adjacent a longitudinal gap in sheet metal tubing, which method comprises: longitudinally advancing the tubing with the portions in nonoverlapping relation and then at a later position bringing one of said portions into overlying lapped relation to and with a diminishing spaced relation to the other, whereby a narrow band on the undersurface of the overlying portion comes into contact with a narrow band on the upper surface of the underlying portion at a desired weld point; heating said portions both in advance of said position and the weld point by maintaining on same flows of electrical current of a frequency of the order of 100,000 cycles per second or higher by applying to said portions respectively current from the two terminals of a source of such current at points in advance of said position, the current to the overlying portion being applied to the upper surface thereof and the current being applied to the underlying portion also on the upper surface thereof, whereby the current flows from the points of application along the edges of said portions, to the bands and to and from the weld point along said bands, the current becoming more and more concentrated on the surfaces of said bands as they approach contact with each other due to the mutual inductance of the current flowing thereon at said high frequency; maintaining supporting means within the tubing and engaging the undersurface of the underlying portion to retain same at a predetermined elevation while passing beneath the weld point; applying pressure to the upper surface of the overlying portion substantially directly over the weld point to press said portion firmly against and into welded relation to the underlying portion, the current as applied being sufficient to heat the surface of the metal along on said bands to welding temperature as same reach the weld point.

7. Method as set forth in claim 6, further comprising applying tension to said portions from said points at which said current is supplied to the weld point.

8. Method for welding together with a lapped seam, the portions adjacent a longitudinal gap in tubing formed of thin and flexible sheet metal no greater than approximately 0.010 inches in thickness, which method comprises: longitudinally advancing the tubing with the portions in nonoverlapping, edge-to-edge relation and then at a later position bringing one of said portions into overlying lapped relation to, and with a diminishing spaced relation to the other, and whereby a narrow band on the undersurface of the overlying portion comes into contact with a narrow band on the upper surface of the underlying portion at a desired weld point; heating said portions both in advance of said position and the weld point by maintaining on same flows of electrical current of a frequency of the order of 100,000 cycles per second or higher by applying to said portions respectively current from the two terminals of a source of such current at points in advance of said position, whereby the current flows from the points of application to and from the weld point along the edges of said portions and on said bands, the current becoming more and more concentrated on the surfaces of said bands as they approach contact with each other due to the mutual inductance of the current flowing thereon at said high frequency; maintaining supporting means within the tubing under said points and engaging the undersurface of the underlying portion at a region beneath the weld point; applying pressure to the upper surface of the overlying portion over the weld point to press said portion firmly against and into welded relation to the underlying portion, the speed of such longitudinal advancing and the current as applied being such as to cause heating of substantially only the contacting surfaces of the metal along said bands to welding temperature substantially as same reach the weld point.

9. The method of forming tubing with an electrically welded lapped seam comprising advancing a metal strip, forming said strip into a partially closed tube with spaced, nonoverlapping edges and of a first predetermined radius at a first position, bringing the edge portions into spaced overlapping relation at a second succeeding position while maintaining the edge portions in nonoverlapping relation intermediate said first and second positions, pressing said edge portions together at a third position succeeding said second position and maintaining high-frequency currents having a frequency of the order of 100,000 cycles per second or higher on the edge portions during the movement thereof from said first to said third positions.

10. The method of forming tubing with an electrically welded lapped seam comprising advancing a metal strip, forming said strip into a partially closed tube with spaced edges and of a first predetermined radius at a first position, distending said tube to a larger radius at a second succeeding position, bringing the edge portions into spaced overlapping relation at a third succeeding position while maintaining the edge portions in nonoverlapping relation intermediate said second and third positions, pressing said edge portions together at a fourth position succeeding said third position and maintaining high-frequency heating currents having a frequency of the order of 100,000 cycles per second or higher on the edge portions during the movement thereof from said second to said fourth positions.

11. Apparatus for welding together metal edge portions with a lapped seam comprising means for advancing said edge portions, spacing means for maintaining said edge portions in spaced-apart, nonoverlapping relation, lapping means following said spacing means for bringing said edge portions into spaced apart, overlapping relation, means for pressing the overlapped edge portions together at a weld point, and means for supplying electrical heating current of a frequency of the order of 100,000 cycles per second or higher to said edge portions in advance of the position in which they are first brought into overlapping relation.

12. Apparatus for welding together metal edge portions with a lapped seam comprising means for advancing said edge portions, shoe means for maintaining said edge portions in edge-to-edge, nonoverlapping relation, lapping means following said shoe means for bringing said edge portions into spaced-apart, overlapping relation, means for pressing the overlapping edge portions together at a weld point, and means for supplying electrical heating current of a frequency of the order of 100,000 cycles per second or higher to said edge portions in advance of the position in which they are brought into overlapping relation.

13. Apparatus as set forth in claim 12 wherein said means for supplying electrical heating current comprises a pair of contacts located in opposed relation with respect to said shoe means so as to receive said edge portions between said contacts and said shoe mans whereby pressure of said contacts on said edge portions is opposed by said shoe means.

14. Apparatus for welding together with a lapped seam the edge portions adjacent a longitudinal gap in metal tubing comprising means for advancing said tubing, spacing means for maintaining said edge portions in spaced-apart, nonoverlapping relation, lapping means following said spacing means for bringing said edge portions into spaced-apart, overlapping relation, means for pressing the overlapped edge portions together at a weld point, and means for supplying electrical heating current of a frequency of the order of 100,000 cycles per second or higher to said edge portions in advance of the position in which they are brought into overlapping relation.

15. Apparatus for welding together with a lapped seam the edge portions adjacent a longitudinal gap in tubing formed of sheet metal, such apparatus comprising in combination: means for rapidly advancing the tubing, first means for bringing said edge portions into spaced, edge-to-edge relation, second means for thereafter bringing one of said portions in overlying lapped relation to, and with a diminishing spaced relation to the other commencing at a predetermined position, whereby a narrow band on the undersurface of the overlying portion will come into contact with a narrow band on the upper surface on the underlying portion at a desired weld point; means for heating said bands in advance of the weld point comprising a source of electrical current of a frequency of the order of 100,000 cycles per second or higher and current transfer means connected to the terminals of said source and positioned to supply such current to said portions substantially in advance of said position, whereby the current will flow along said edge portions in advance of said position and to and from the weld point along on said bands; a roller positioned in the tubing to engage the zone of the lapped seam therein to support same at a predetermined elevation while passing beneath the weld point; supporting means extending into the tubing for supporting said roller on substantially a fixed axis; and a pressure-applying roller and means for supporting same in a position to apply pressure to the overlying portion at a zone substantially directly over the weld point to press said portion firmly against and into welded relation to the underlying portion.

16. Apparatus for welding together with a lapped seam the edge portions adjacent a longitudinal gap in tubing formed of thin flexible sheet metal, such apparatus comprising in combination: means for rapidly advancing the tubing at a speed of at least several hundred feet per minute and bringing one of said portions in overlying lapped relation to, and with a diminishing spaced relation to the other commencing at a predetermined position, whereby a narrow band on the undersurface of the overlying portion will come into contact with a narrow band on the upper surface on the underlying portion at a desired weld point; means for heating said bands in advance of the weld point comprising a source of electrical current of a frequency of the order of 100,000 cycles per second or higher and a pair of contacts connected to the terminals of said source respectively and respectively positioned to apply such current to said edge portions substantially in advance of said position, whereby the current will flow from said contacts respectively to and from the weld point and along on said bands; a supporting roller positioned in the tubing to engage the zone of the lapped seam therein to support same at a predetermined elevation while passing beneath the weld point; supporting means extending into the tubing for supporting said roller on substantially a fixed axis; a pressure-applying roller and means for supporting same in a position to apply pressure to the overlying portion at a zone substantially directly over the weld point to press said portion firmly against and into welded relation to the underlying portion, and a shoe mounted on said supporting means and underlying said contacts for maintaining said portions in spaced, nonoverlapping relation and under tension in advance of said position, said shoe having a surface for engaging the inner surfaces of said portions which is higher in elevation than said supporting roller.

* * * * *

Disclaimer 3,627,964.—*Jack Morris*, Monsey, N.Y. LAPPED WELDING OF METAL EDGE PORTIONS. Patent dated Dec. 14, 1971. Disclaimer filed Dec. 21, 1973, by the assignee, *Thermatool Corp.*

Hereby enters this disclaimer to claims 1, 2, 3, 9, 12 and 15 of said patent.

[*Official Gazette February 26, 1974.*]